US011541600B2

(12) United States Patent
Price et al.

(10) Patent No.: US 11,541,600 B2
(45) Date of Patent: Jan. 3, 2023

(54) RAPID WASH CARRIER PLATFORM FOR ADDITIVE MANUFACTURING OF DENTAL MODELS

(71) Applicant: Carbon, Inc., Redwood City, CA (US)

(72) Inventors: R. Griffin Price, Redwood City, CA (US); W. Ryan Powell, Sunnyvale, CA (US); Yongqiang Li, Sunnyvale, CA (US)

(73) Assignee: Carbon, Inc., Redwood City, CA (US)

( * ) Notice: Subject to any disclaimer, the term of this patent is extended or adjusted under 35 U.S.C. 154(b) by 730 days.

(21) Appl. No.: 16/357,688

(22) Filed: Mar. 19, 2019

(65) Prior Publication Data

US 2019/0291347 A1    Sep. 26, 2019

Related U.S. Application Data

(60) Provisional application No. 62/645,355, filed on Mar. 20, 2018.

(51) Int. Cl.
*B29C 64/35* (2017.01)
*B33Y 10/00* (2015.01)
(Continued)

(52) U.S. Cl.
CPC .......... *B29C 64/35* (2017.08); *A61C 13/0013* (2013.01); *A61C 13/34* (2013.01);
(Continued)

(58) Field of Classification Search
CPC ...... B29C 64/245; B29C 64/124; B33Y 10/00
See application file for complete search history.

(56) References Cited

U.S. PATENT DOCUMENTS

| 4,020,208 A | 4/1977 | Mercer et al. |
| 5,039,567 A | 8/1991 | Landi et al. |

(Continued)

FOREIGN PATENT DOCUMENTS

| IT | 274727 | 8/2015 |
| WO | 2001/72501 | 10/2001 |

(Continued)

OTHER PUBLICATIONS

Dendukuri et al., Stop-flow lithography in a microfluidic device, Lab Chip, 2007, 7, 818-828, published online May 21, 2007.

(Continued)

*Primary Examiner* — Larry W Thrower
(74) *Attorney, Agent, or Firm* — Myers Bigel, P.A.

(57) ABSTRACT

A method of making an object by additive manufacturing includes: (a) providing an additive manufacturing apparatus including a light source; (b) providing a carrier platform having a substantially planar object adhesion surface, the adhesion surface having a plurality of elongate wash channels formed therein; (c) producing the object on the carrier platform adhesion surface with the additive manufacturing apparatus from a light polymerizable resin, the object having at least one internal cavity formed therein; then (d) washing the object on the carrier platform with a wash liquid under conditions in which the wash liquid reaches the at least one internal cavity through the wash channels; then (e) optionally, at least partially drying the object on the carrier platform by separating the same from the wash liquid, and then agitating the object on the carrier platform to drain excess wash liquid from the object; (f) optionally, further curing the object.

10 Claims, 5 Drawing Sheets

(51) Int. Cl.
  *B33Y 30/00* (2015.01)
  *B29C 64/124* (2017.01)
  *A61C 13/34* (2006.01)
  *A61C 13/00* (2006.01)
  *B29C 64/245* (2017.01)
  *B33Y 40/20* (2020.01)
  *B29L 31/00* (2006.01)
  *B33Y 80/00* (2015.01)

(52) U.S. Cl.
  CPC .......... *B29C 64/124* (2017.08); *B29C 64/245* (2017.08); *B33Y 10/00* (2014.12); *B33Y 30/00* (2014.12); *B33Y 40/20* (2020.01); *B29L 2031/753* (2013.01); *B33Y 80/00* (2014.12)

(56) References Cited

U.S. PATENT DOCUMENTS

| | | | |
|---|---|---|---|
| 5,122,441 A | 6/1992 | Lawton et al. | |
| 5,236,637 A | 8/1993 | Hull | |
| 5,391,072 A | 2/1995 | Lawton et al. | |
| 5,879,780 A | 3/1999 | Kindinger et al. | |
| 7,328,077 B2 | 2/2008 | Durbin et al. | |
| 7,424,967 B2 | 9/2008 | Ervin et al. | |
| 7,438,846 B2 | 10/2008 | John | |
| 7,481,647 B2 | 1/2009 | Sambu et al. | |
| 7,678,440 B1 | 3/2010 | McKnight et al. | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 8,738,340 B2 | 5/2014 | Dunne et al. | |
| 9,116,428 B1 | 8/2015 | Jacobsen et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,375,298 B2 | 6/2016 | Boronkay et al. | |
| 9,498,920 B2 | 11/2016 | Desimone et al. | |
| 9,921,037 B2 | 3/2018 | Wadley et al. | |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,384,394 B2 | 8/2019 | McCluskey | |
| 10,596,755 B2 | 3/2020 | Desimone et al. | |
| 10,618,215 B2 | 4/2020 | Desimone et al. | |
| 2006/0080835 A1 | 4/2006 | Kooistra et al. | |
| 2011/0089610 A1 | 4/2011 | El-Siblani et al. | |
| 2011/0283873 A1 | 11/2011 | Wadley et al. | |
| 2013/0052396 A1 | 2/2013 | Dean et al. | |
| 2013/0143060 A1 | 6/2013 | Jacobsen et al. | |
| 2013/0292862 A1 | 11/2013 | Joyce | |
| 2013/0295212 A1 | 11/2013 | Chen et al. | |
| 2014/0041689 A1* | 2/2014 | Namba | H01L 21/68742 134/22.1 |
| 2015/0277146 A1 | 10/2015 | Crespo et al. | |
| 2015/0331402 A1 | 11/2015 | Lin et al. | |
| 2015/0360419 A1 | 12/2015 | Willis et al. | |
| 2016/0361889 A1 | 12/2016 | Bartolome | |
| 2017/0129167 A1 | 5/2017 | Castanon | |
| 2017/0129169 A1 | 5/2017 | Batchelder et al. | |
| 2017/0217088 A1* | 8/2017 | Boyd, IV | B29C 64/209 |
| 2017/0360534 A1 | 12/2017 | Sun et al. | |
| 2018/0095448 A1 | 4/2018 | Vernon | |
| 2018/0154437 A1* | 6/2018 | Mark | B22F 1/0085 |
| 2018/0264718 A1 | 9/2018 | McCluskey | |
| 2018/0264719 A1 | 9/2018 | Rolland et al. | |
| 2018/0304541 A1 | 10/2018 | Barth | |
| 2019/0039213 A1 | 2/2019 | Merlo et al. | |
| 2019/0126547 A1 | 5/2019 | Desimone et al. | |
| 2019/0263070 A1 | 8/2019 | Barth | |
| 2019/0389127 A1 | 12/2019 | Desimone et al. | |
| 2020/0139617 A1 | 5/2020 | Desimone et al. | |
| 2020/0246119 A1 | 8/2020 | Long et al. | |
| 2020/0324479 A1* | 10/2020 | Friedrich | B08B 11/02 |
| 2020/0362157 A1 | 11/2020 | Parkar et al. | |
| 2021/0163664 A1 | 6/2021 | Klun et al. | |
| 2021/0206096 A1 | 7/2021 | Mansouri et al. | |
| 2021/0299950 A1 | 9/2021 | Wolter et al. | |
| 2021/0370393 A1 | 12/2021 | Lee et al. | |

FOREIGN PATENT DOCUMENTS

| | | |
|---|---|---|
| WO | 2011/086450 | 7/2011 |
| WO | 2018/182974 | 10/2018 |

OTHER PUBLICATIONS

Dendurkuri et al., Continuous-flow lithography for high-throughput microparticle synthesis, Nature Materials, vol. 5, pp. 365-369, May 2006, published online Apr. 9, 2006.

Dendurkuri et al., Modeling of Oxygen-Inhibited Free Radical Photopolymerization in PDMS Microfluidic Device, Macromolecules, 2008, 41 (22), 8547-8556, published Oct. 21, 2008.

J. Tumbleston et al., Continuous liquid interface production of 3d objects, Science 347, 1349-1352 (published online Mar. 16, 2015).

Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.

Stern, S.A., The 'Barrer' Permeability Unit, pp. 1933-1934 (1968) Journal of Polymer Science, Part A-2, vol. 6.

Y. Pan et al., J. Manufacturing Sci. and Eng. 134, 051011-1 (Oct. 2012).

Yasuda et al. Permeability of Polymer Membranes to Dissolved Oxygen, pp. 1314-1316 (1966) Journal of Polymer Science, vol. 4.

* cited by examiner

RAPID WASH CARRIER PLATFORM FOR ADDITIVE MANUFACTURING OF DENTAL MODELS

RELATED APPLICATIONS

This application claims priority from U.S. Provisional Application No. 62/645,355, filed Mar. 20, 2018, the disclosure of which is hereby incorporated herein in its entirety.

FIELD OF THE INVENTION

The present invention concerns additive manufacturing, and particularly concerns systems for additive manufacturing in which residual resin is more rapidly washed from additively manufactured objects.

BACKGROUND OF THE INVENTION

Dental models and dies are used to prepare prosthetic crowns for patients, typically in labs where the crowns are manufactured, and then tested and modified by dental artisans as required, before they are sent to the dentist for fitting onto a previously prepared tooth of a patient (see, e.g., U.S. Pat. No. 7,328,077). Because humans are so sensitive to even slight mis-alignments between their teeth, a high level of accuracy for such models is required (see, e.g., U.S. Pat. No. 8,738,340).

Currently, the most accurate dental models and dies are milled from larger blocks of materials on five-axis milling machines. While accurate, such machines are expensive, and can be slow. And, speed of manufacture is important, because temporary crowns can be fragile, and a patient's teeth can shift surprisingly quickly if the permanent crown is not promptly installed (potentially requiring the manufacture of an entirely new crown).

Additive manufacturing techniques would seem ideally suited to the production of dental models and dies. Unfortunately, the more accurate techniques, such as jet-printing methods, can be extremely slow (for example, requiring approximately five hours to produce the model), and can generate objects with poor material and handling properties. The more rapid techniques (such as stereolithography), on the other hand, can sometimes produce models and dies with less accuracy than desired (see, e.g., U.S. Pat. No. 9,375,298 to Boronkay et al.; U.S. Pat. No. 7,481,647 to Sambu et al.). Further, such techniques are generally carried out by photopolymerizing a viscous resin, with few techniques available for rapidly washing the viscous resin from the objects once they are produced.

SUMMARY OF THE INVENTION

A method of making an object by additive manufacturing can be carried out by:

(a) providing an additive manufacturing apparatus (e.g., a bottom up or top down stereolithography apparatus), the apparatus including a light source;

(b) providing a carrier platform having a substantially planar object adhesion surface, the adhesion surface having a plurality of elongate wash channels formed therein (e.g., oriented from side-to-side, radially, etc.);

(c) producing the object on the carrier platform adhesion surface with the additive manufacturing apparatus from a light polymerizable resin, the object having at least one internal cavity formed therein; then (d) washing the object on the carrier platform with a wash liquid under conditions in which the wash liquid reaches the at least one internal cavity through the wash channels; and then (e) optionally, at least partially drying the object on the carrier platform by separating the same from the wash liquid, and then agitating the object on the carrier platform to drain excess wash liquid from said object;

(f) optionally, further curing (e.g., by heating) the object (while still connected to, or separated from, the carrier platform).

Carrier platforms for carrying out the foregoing methods are also described herein.

While the present invention is primarily illustrated with application to dental models, it will be appreciated that it can be applied to any of a variety of useful objects that are produced by additive manufacturing, including but not limited to housings for electronic devices or components.

DWS SRL, Improved Stereolithographic Machine and Modeling Head for a Stereolithographic Machine, Italian Patent No. 274727, describes a perforated carrier platform for additive manufacturing for the purpose of reducing suction-force adhesion during stereolithography. Use of such a platform for facilitating washing of objects retained therein is neither suggested nor described.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

Like numbers are assigned to analogous elements in the Figures herein and discussed below, generally differentiated by an alphabetic suffix or an apostrophe.

1. Additive Manufacturing Methods and Apparatus.

Additive manufacturing of objects is preferably carried out with polymerizable resins by additive manufacturing, particularly stereolithography, and preferably bottom-up stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. Such techniques typically involve projecting light through a window above which a pool of resin (or polymerizable liquid) is carried. A general purpose or functional part carrier is typically positioned above the window and above the pool, on which the growing object is produced.

In some embodiments of the present invention, the object is formed by continuous liquid interface production (CLIP). CLIP is known and described in, for example, PCT Applications Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, Science 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form.

In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017). Other examples of methods and apparatus for carrying out particular embodiments of CLIP, or of additive manufacturing, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018).

In some embodiments, the additive manufacturing apparatus can be a Carbon, Inc. M1 or M2 apparatus implementing continuous liquid interface production, available from Carbon, Inc., 1089 Mills Way, Redwood City, Calif. 94063 USA.

2. Resins.

Resins, or photopolymerizable liquids, used in carrying out the methods of the invention, can be conventional resins, or dual cure resins (that is, resins requiring further cure following additive manufacturing, such as a baking step). Numerous suitable resins are known and include, but are not limited to those described in the references above. In some embodiments, dual cure resins such as described in U.S. Pat. Nos. 9,453,142 or 9,598,606 to Rolland et al., can be used.

In some embodiments, the resin is one which, when polymerized to produce the model and die, produces a model and die comprised of poly(acrylate), poly(methacrylate), poly(urethane acrylate), poly(urethane methacrylate), poly (epoxy acrylate), or poly(epoxy methacrylate).

In some embodiments, the resin is one which, when polymerized to produce the model and die, produces a model and die comprising or consisting of a polymer having: a tensile modulus of 1200 or 1600 MPa to 3000 MPa, or more; an elongation at break of 2% to 100 or 140%, or more; a flexural strength of 40 or 60 MPa, to 100 or 120 MPa, or more; and/or a flexural modulus (chord, 0.5%-1% strain) of 1500 or 2000 MPa, to 3000 MPa, or more.

Particular examples of suitable resins include, but are not limited to, Carbon, Inc., UMA resins (particularly PR25 resin in the UMA resin family), as well as Carbon, Inc. RPU and EPX dual cure resins, available from Carbon, Inc., 1089 Mills Way, Redwood City, Calif. 94063 USA.

3. Post-Production Steps.

As noted above, aspects of the invention involve washing the object, and then (depending on the choice of resin) further curing the object.

Washing. After the intermediate object is formed, it is optionally washed (e.g., with an organic solvent), optionally dried (e.g., air dried) and/or rinsed (in any sequence).

Solvents (or "wash liquids") that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009). Additional examples include hydrofluorocarbon solvents (e.g., 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.); hydrochlorofluorocarbon solvents (e.g., 3,3-Dichloro-1,1,1,2,2-pentafluoropropane, 1,3-Dichloro-1,1,2,2,3-pentafluoropropane, 1,1-Dichloro-1-fluoroethane, etc.); hydrofluorether solvents (e.g., methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc.); volatile methylsiloxane solvents (e.g., hexamethyldisiloxane (OS-10, Dow Corning), octamethyltrisiloxane (OS-20, Dow Corning), decamethyltetrasiloxane (OS-30, Dow Corning), etc.), including mixtures thereof.

Any suitable cleaning apparatus may be used, including but not limited to those described in U.S. Pat. Nos. 5,248,456; 5,482,659, 6,660,208; 6,996,245; and 8,529,703.

A preferred wash apparatus is a Carbon, Inc. smart part washer, available from Carbon, Inc., 1089 Mills Way, Redwood City, Calif. 94063 USA. Thus in some embodiments, the wash step, when included, may be carried out by immersing the object in a wash liquid such as described above, with agitation (e.g., by rotating the composite article in the wash liquid), optionally but preferably with the wash step carried out in a total time of 10 minutes or less.

Further curing. Further (or second) curing may be carried out by any suitable technique, including but not limited to those described in U.S. Pat. No. 9,453,142. In a preferred embodiment, the further curing is carried out by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the object at ambient temperature for a sufficient time to effect further cure—is in some embodiments preferred. Ovens may be batch or continuous (conveyor) ovens, as is known in the art.

Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at at least a first (oven) temperature and a second (oven) temperature, with the first temperature greater than ambient temperature, the second temperature greater than the first temperature, and the second temperature less than 250° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

4. Rapid Wash System.

In the present invention, the components described above are further combined with the features described herein to provide a system in which objects such as dental models are more rapidly washed following additive manufacturing.

Figure 2A:
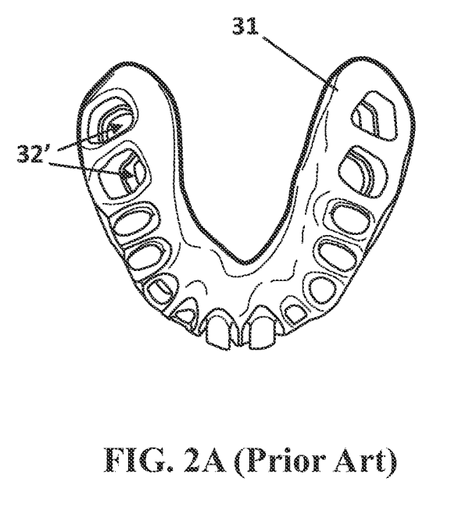
FIG. 2A is a top perspective view of a dental model of the prior art, which may be produced and washed on a carrier platform of the present invention.
Figure 2B:
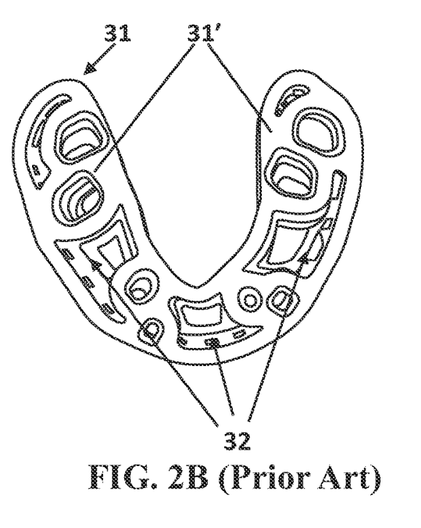
FIG. 2B is a bottom perspective view of the central model of FIG. 2A.

FIGS. 2A-2B show an example dental model 31 of the prior art. The dental model includes (in this particular non-limiting illustration) elongate through-holes 32' in which dental dies may be inserted. As visible in FIG. 2B, the model has a bottom surface 31', which bottom surface is adhered to the carrier platform, and through which bottom surface through which at least one, and typically a plurality of, internal cavities 32 project.

A problem with the dental model of FIGS. 2A-2B is that, when the bottom surface 31' is adhered to the (generally solid, flat, planar) carrier platform of an additive manufacturing apparatus, and when attempting to wash residual resin from the object following additive manufacturing with the object still on the carrier platform, wash liquid cannot reach the internal cavities 32 sufficiently to remove excess resin therefrom. This problem is addressed by the carrier platforms and methods described below.

Figure 1A:
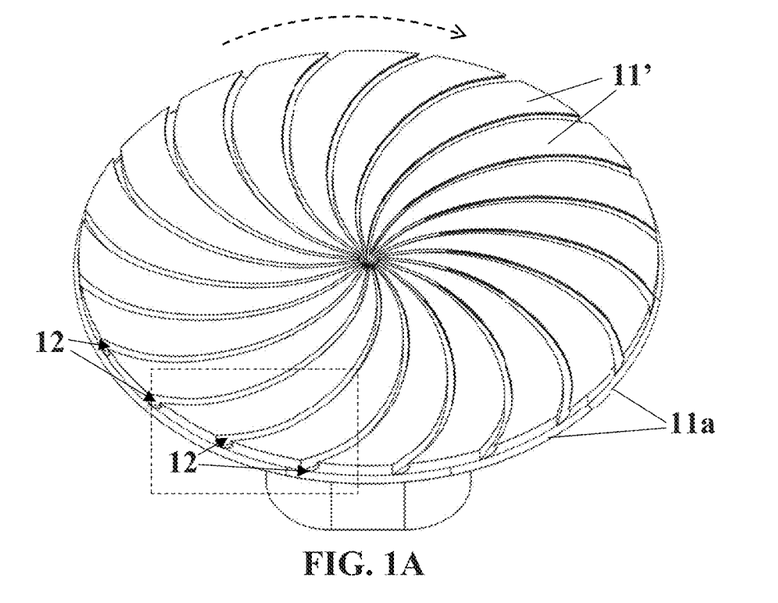
FIG. 1A is a perspective view of a carrier platform of the present invention.
Figure 1B:
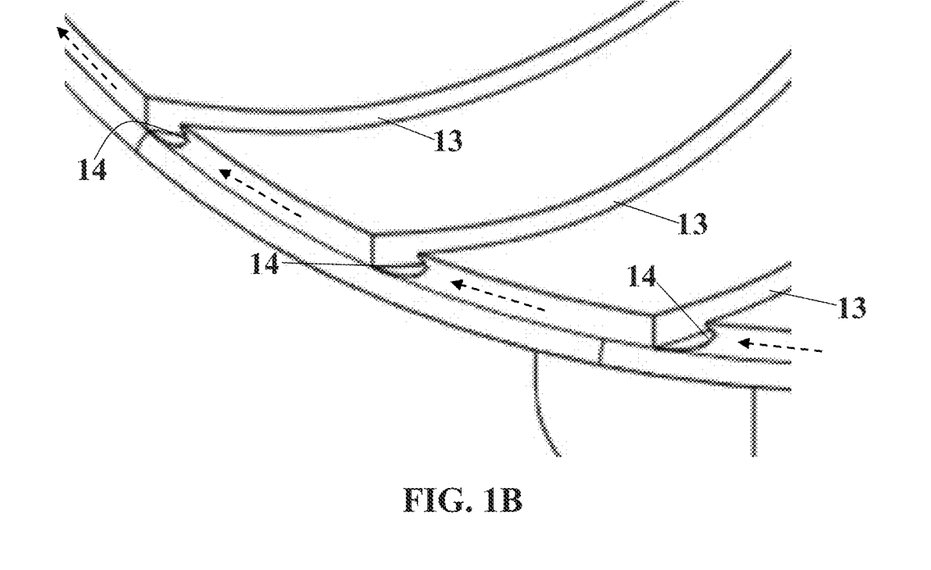
FIG. 1B is a detailed view of the carrier platform of FIG. 1A.

FIGS. 1A-1B illustrate a first embodiment of a carrier platform 11a useful for carrying out the present invention. In general, the platform includes a body having a substantially planar object adhesion surface 11' formed thereon, and a plurality of elongate wash channels 12 formed in the adhesion surface. As discussed further below, the elongate wash channels may extend fully or partially across the adhesion surface (e.g., radially, from side-to-side, etc.).

In some embodiments, the carrier platform has a central axis, and the elongate wash channels are configured to facilitate, force or pump wash liquid towards said central axis upon agitation (e.g., reciprocation, rotation, etc.) of the carrier platform in at least one direction around or about the central axis when immersed in a wash liquid.

As noted in FIGS. 1A-1B (and also in FIGS. 3-4), in some embodiments at least some of the wash channels are curved. As shown in FIG. 1B, the elongate wash channels may include a pair of opposite side walls 13, 14 where at least one side wall 14 is arcuate and forms a hydrofoil side configured to direct wash liquid into the channel 12. The preferred direction of reciprocation or rotation is shown by the dashed arrows, though it will be appreciated (particularly in light of the figures below) that an additional set of intersecting, curved channels can be added, that would enhance the flow of wash liquid when rotation or reciprocation is carried out in the opposite direction.

Figure 3:
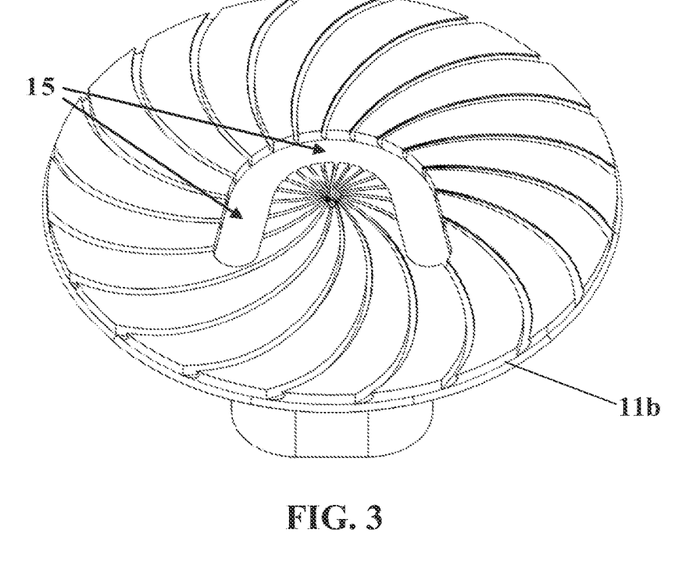
FIG. 3 is a perspective view of a second embodiment of a carrier platform of the present invention.

FIG. 3 shows an embodiment of a carrier platform 11b similar to that shown in FIGS. 1A-1B, but further including a wash liquid collection well 15 formed in the adhesion surface. During additive production, the object may be produced with its internal cavity at least partially aligned with the well, to facilitate the flow of wash liquid into the cavity. Note in FIG. 3 that at least some of the wash channels are in fluid communication with the wash liquid collection well (by the portions of each thereof recessed below the adhesion surface).

Figure 4:
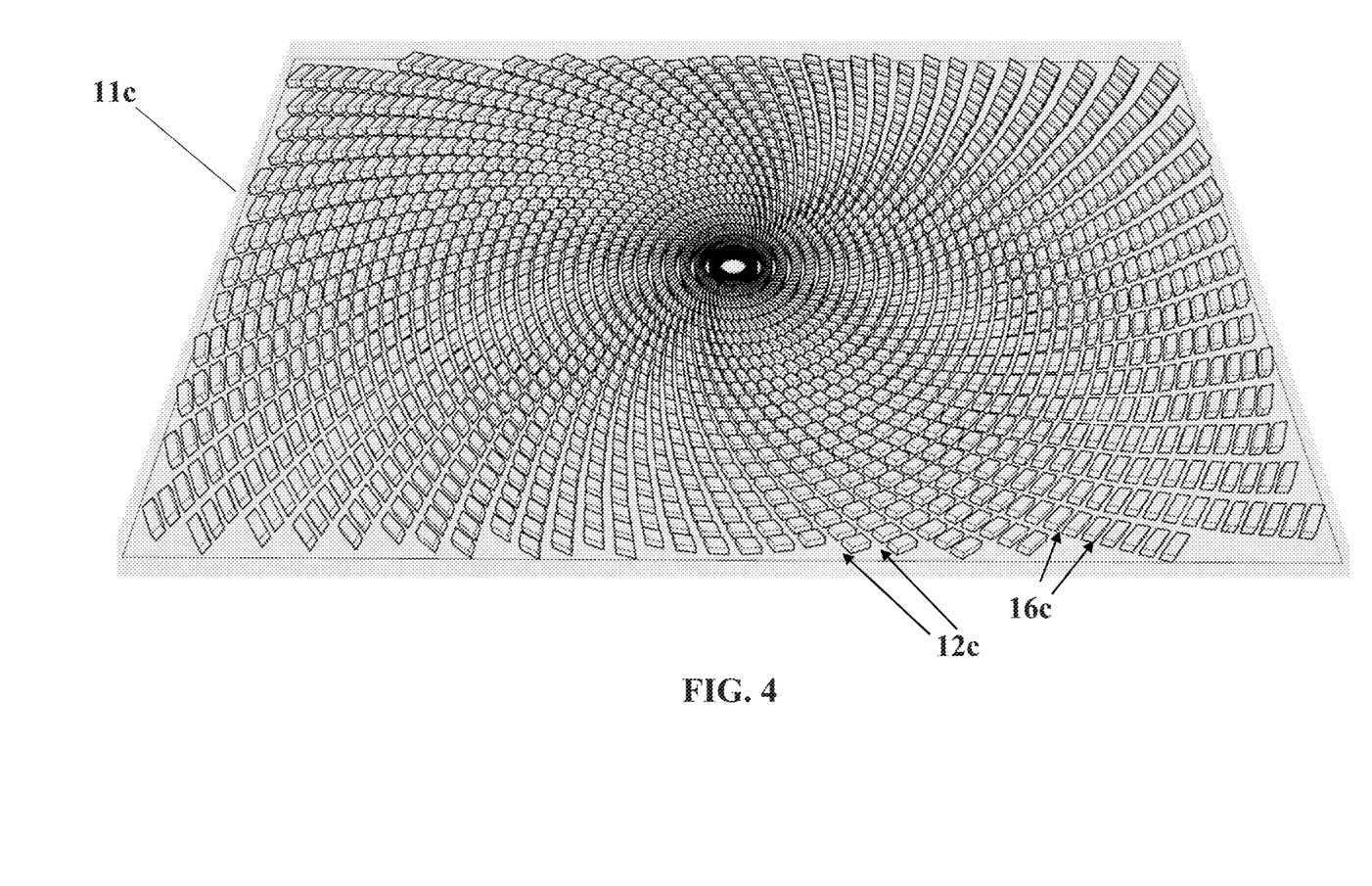
FIG. 4 is a perspective view of a third embodiment of a carrier platform of the present invention.
Figure 5:
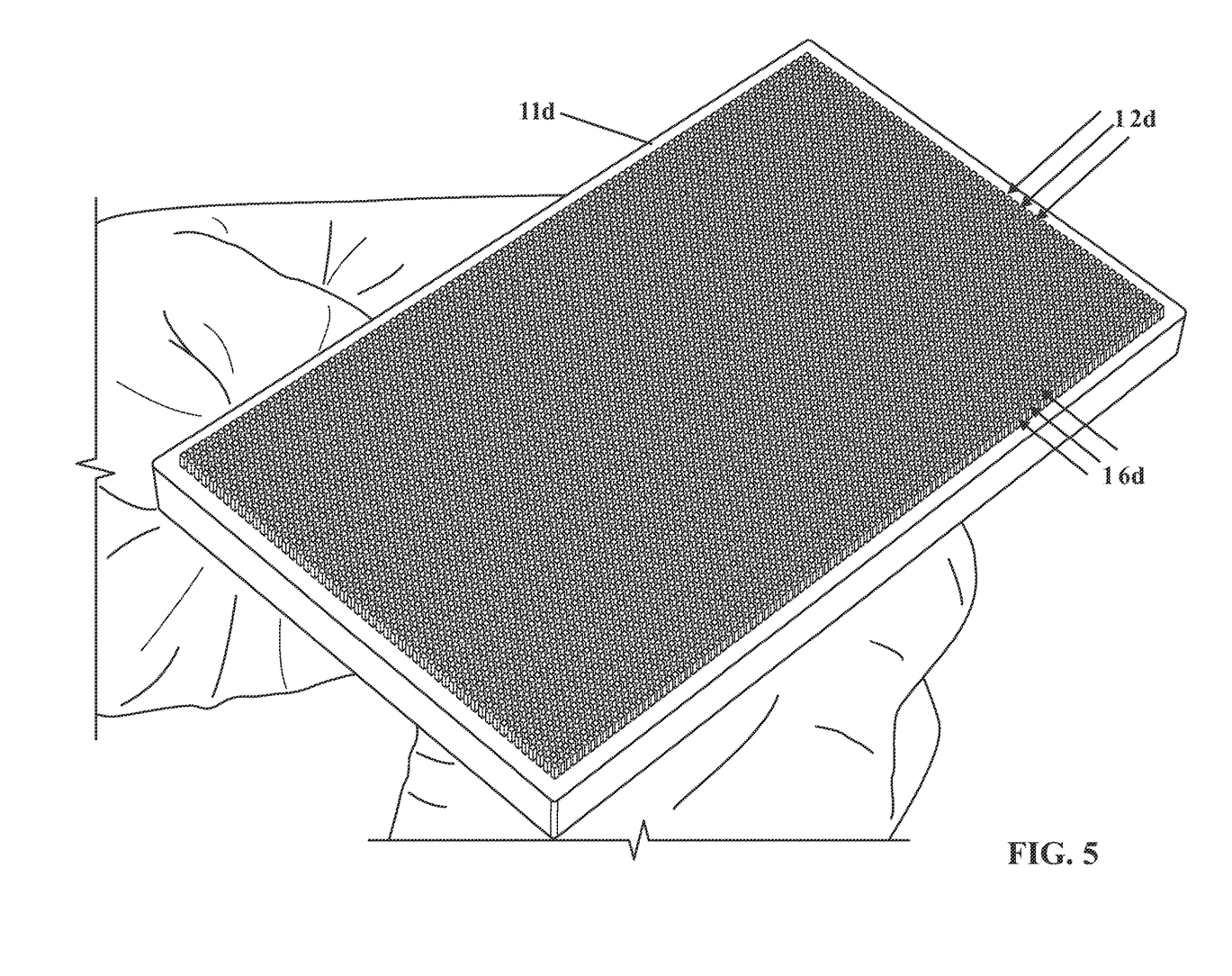
FIG. 5 is a perspective view of a fourth embodiment of a carrier platform of the present invention.

FIGS. 4-5 show further embodiments of carrier platforms 11c, 11d of the invention, where the elongate wash channels comprise at least a first and second set of wash channels (12c, 16c in FIGS. 4 and 12d, 16d in FIG. 5). The channels of each set may be substantially parallel to one another (though this is optional), and the channels of the first set intersect with the channels of the second set. In the embodiment of FIG. 4, one set of (substantially parallel) channels, 12c, is curved (and radially) arranged, while the second set 16c is arranged as a set of nested circumferential channels. In the embodiment of FIG. 5, the intersecting sets of channels are not radially arranged, as in FIGS. 1, 3, and 4, but the intersecting sets of channels 12d, 16d nevertheless provides a configuration that still facilitates the flow of wash liquid into cavities in the object during the wash cycle agitation (and advantageously, in both directions of rotation).

Figure 6:
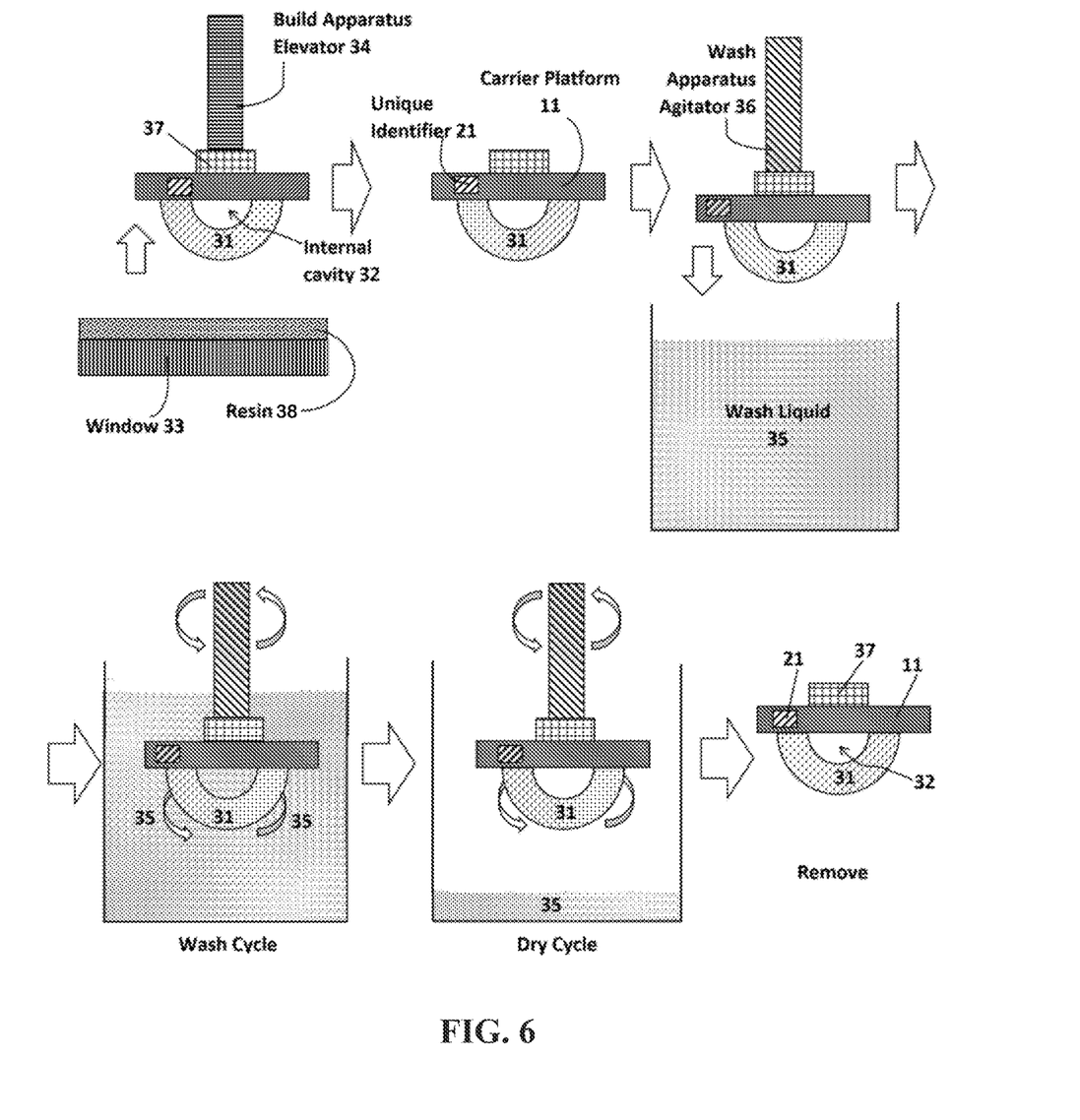
FIG. 6 is a schematic diagram of a process of additive manufacturing and washing, carried out with a carrier platform of the present invention.

As shown in FIG. 6, in some embodiments the object 31 (with an internal cavity 32) is produced on a bottom-up stereolithography apparatus in which a resin 38 (such as described in sections 1 and 2 above) is carried by a window 33, through which an image is projected. The object 31 is produced on a carrier platform 11 (wash channels not shown), which is in turn advanced away from the window by the build apparatus elevator 34. In some embodiments, the carrier platform 11 may include a unique identifier 21, with the production apparatus and wash apparatus optionally including an identifier reader to record the identity of the particular object being produced and washed, and/or identify the type of carrier platform being received.

After additive manufacture, the object is transferred, while still on the carrier platform, to a wash apparatus agitator 36, by which it is immersed in a wash liquid 35 and agitated, such as by shaking or spinning (although the converse can also be done, or keeping the object 31 static and agitating the wash liquid). Note the wash liquid 35 penetrates into the internal cavity 32 during the wash cycle. The level of wash liquid in the wash vessel can then be lowered and the object, still on the carrier, further agitated to shake or spin off excess wash liquid and resin, in a dry cycle (and note the wash liquid also drains, at least in part, from the internal cavity during the dry cycle). The wash and dry cycle may optionally be repeated one or more times, after which the object can be removed from the carrier for final processing, and/or for further curing (e.g., by heating or baking) as discussed above.

A locking element 37 on the carrier platform upper portion can be used to conveniently removably connect the carrier platform to the apparatus elevator 34 and the wash apparatus agitator 36. Any suitable configuration of manual, or automated, lock element can be used, including nuts, bolts, cams, gates, mortises, tenons, etc., including combinations thereof, with the cooperating features provided on the elevator 34 and agitator 36.

As noted above, the unique identifier on the carrier platform may be utilized to identify the carrier platform type by the wash apparatus, so that the wash cycle parameters (e.g., speed of rotation, direction of rotation, duration, number of rinse cycles, etc.) may be modified or matched to the particular carrier platform being received.

The foregoing is illustrative of the present invention, and is not to be construed as limiting thereof. The invention is defined by the following claims, with equivalents of the claims to be included therein.

We claim:

1. A method of making an object by additive manufacturing, comprising:
   (a) providing an additive manufacturing apparatus, the apparatus including a light source;
   (b) providing a carrier platform having a substantially planar object adhesion surface, said adhesion surface having a plurality of elongate wash channels formed therein;
   (c) producing said object on said carrier platform adhesion surface that faces downward with said additive manufacturing apparatus from a light polymerizable resin, said producing comprising advancing upward an elevator with said carrier platform connected thereto, said object having at least one internal cavity formed therein; then
   (d) removing said carrier platform with said object thereon from said elevator; then
   (e) transferring said carrier platform with said object thereon from said additive manufacturing apparatus to a wash apparatus; then
   (f) connecting said carrier platform with said object thereon to an agitator of said wash apparatus; then
   (g) washing said object on said carrier platform with a wash liquid in said wash apparatus under conditions in which the wash liquid reaches said at least one internal cavity through said wash channels; and then
   (h) optionally, at least partially drying said object on said carrier platform by separating said object on said carrier platform from said wash liquid and then agitating said object on said carrier platform to drain excess wash liquid from said object;
   (i) optionally, further curing said object while still connected to, or separated from, said carrier platform,
   wherein said additive manufacturing apparatus comprises a bottom-up stereolithography apparatus.

2. The method of claim 1, wherein said washing step is carried out by rotating said carrier platform with said object thereon in said wash liquid.

3. The method of claim 2, wherein said at least partially drying step is carried out by rotating said carrier platform once separated from said wash liquid in a same direction or in an opposite direction as said washing step rotating.

4. The method of claim 1, said carrier platform having a central axis, wherein said elongate wash channels are configured to facilitate, force or pump wash liquid toward said central axis upon rotation of said carrier platform in at least one direction around said central axis when immersed in a wash liquid.

5. The method of claim 4, wherein at least some of said wash channels are curved.

6. The method of claim 5, wherein at least some of said elongate wash channels comprise an arcuate hydrofoil side wall surface configured to direct wash liquid into said channels.

7. The method of claim 1, wherein said elongate wash channels comprise at least a first and second set of wash channels, optionally with the channels of each set substantially parallel to one another, and wherein the channels of said first set intersect with the channels of said second set.

8. The method of claim 7, wherein said wash channels of said first set are linear or curved, and wherein said channels of said second set are linear, curved, or configured as nested circumferential channels.

9. The method of claim 1, wherein said adhesion surface has a wash liquid collection well formed therein, with said object formed with said at least one internal cavity facing said collection well, and with at least some of said wash channels in fluid communication with said collection well.

10. The method of claim 1, wherein said object comprises a dental model having an upper segment and a base segment, and a bottom surface, with said upper segment having a shape corresponding to at least a portion of a dental arch of a human patient, and with said bottom surface adhered to said carrier platform adhesion surface.

* * * * *